United States Patent [19]
Ross

[11] Patent Number: 5,954,359
[45] Date of Patent: Sep. 21, 1999

[54] AIRBAG

[75] Inventor: Hubert Rene Ross, Oberusel, Germany

[73] Assignee: Breed Automotive Technology, Inc., Lakeland, Fla.

[21] Appl. No.: 08/809,478

[22] PCT Filed: Sep. 25, 1995

[86] PCT No.: PCT/GB95/02275

§ 371 Date: May 27, 1997

§ 102(e) Date: May 27, 1997

[87] PCT Pub. No.: WO96/09192

PCT Pub. Date: Mar. 28, 1996

[51] Int. Cl.[6] .................................................. B60R 21/20
[52] U.S. Cl. ........................................... 280/731; 280/742
[58] Field of Search .................................. 280/731, 740, 280/742

[56] References Cited

U.S. PATENT DOCUMENTS

| | | | |
|---|---|---|---|
| 3,680,884 | 8/1972 | Stephenson | 280/731 |
| 3,801,123 | 4/1974 | Jira | 280/731 |
| 3,853,334 | 12/1974 | Auman et al. | 280/731 |
| 5,342,089 | 8/1994 | Fink et al. | 280/731 |
| 5,470,099 | 11/1995 | Williams | 280/731 |
| 5,553,888 | 9/1996 | Turner et al. | 280/731 |

FOREIGN PATENT DOCUMENTS

| | | |
|---|---|---|
| 2061717 | 6/1971 | France . |
| 2200814 | 4/1974 | France . |
| 94 07 808 U | 5/1994 | Germany . |
| 2 282 352 | 4/1995 | United Kingdom . |

*Primary Examiner*—Kenneth R. Rice
*Attorney, Agent, or Firm*—Markell Seitzman

[57] ABSTRACT

A driver's air bag arrangement comprises an inflatable bag (2), a housing (6) and an inflator module and includes a generally cylindrically shaped gas container (3) shaped and dimensioned so that a substantial part of the container is locatable within a coaxial with a steering column shaft (4) of an automobile, or so that it forms an integral part of the steering column shaft, there being additionally a manifold (8) for directing the gas into the bag in the housing to inflate the bag in an evenly distributed manner and to direct the gas flow radially of the steering column shaft. The manifold may comprise a member such as an internally threaded cap nut (5) which is used for securing the air bag housing and/or a steering column to the steering column shaft or inflator.

18 Claims, 10 Drawing Sheets

AIRBAG

DESCRIPTION

The present invention relates to air bag systems and particularly to those located on the driver's side in the vicinity of the steering wheel which are also known as face bags.

Driver's side air bags are used to protect a driver's head, and particularly his face in the event of sudden deceleration of a vehicle, indicative of a crash situation. In such an event, the momentum of the driver continues to propel his body and head forward relative to the decelerating vehicle and though the body may be held by a traditional safety belt restraint this may not be sufficient particularly at high vehicular speeds to prevent his head impacting the steering wheel and causing severe injuries. Air bags have recently been incorporated into vehicles to inflate in a crash situation to provide a soft buffer or cushion between the driver's head and the steering wheel.

Traditionally such an air bag consists of a pyrotechnic device triggered on rapid deceleration of the vehicle to activate an inflator which releases gas rapidly and inflates a woven fabric air bag. When not in use the air bag is folded tightly around the inflator and contained in a housing within the outer circumference of the steering wheel. In this way the bag is positioned for maximum protection and optimum inflation speed.

However the air bag and inflator produce a bulky and heavy package and a steering wheel must be specially built to be large and strong enough to accommodate such a package. The small diameter steering wheels favoured particularly in sport models of automobiles are unsuitable for traditional air bag packages. In addition the weight of the inflator can result in a high moment of inertia and a low resident frequency of the steering system, making the automobile potentially difficult to handle with possible attendant safety implications.

Attempts have been made to adapt the inflator shape to better suit the steering wheel to improve weight distribution. For example, a toroidal inflator is known which provides for a more even weight distribution but is still necessarily heavy since the inflator must be made of strong impermeable material such as steel to safely contain its cargo of compressed gas. The toroidal inflator is more expensive to manufacture and can only be made of a rather limited inflation capacity.

The present invention aims to provide improvements to a driver's air bag.

According to one aspect of the present invention there is provided a driver's air bag arrangement comprising: an inflatable bag, a housing for the bag, an inflator module for inflating the bag, the inflator module comprising an inflator initiator responsive to a crash condition sensor and a source of compressed gas responsive to the inflation initiator to release the gas to inflate the bag through an inflation inlet, wherein the source of compressed gas comprises a generally cylindrically shaped gas container having an outlet for the gas located substantially at or towards one end, the outlet being sealed under non-crash conditions and being unsealed in response to the inflation initiator, and wherein the cylindrically shaped gas container is shaped and dimensioned so that a substantial part of the container is locatable within and coaxial with a steering column shaft of the automobile, or so that it forms an integral part of the steering column shaft, the arrangement further comprising a manifold for directing the gas issuing from the gas source into the bag in the housing to inflate the bag in an evenly distributed manner and to distribute the gas flow into the bag radially of the steering column shaft.

An advantage of the present invention is to provide an air bag and inflator which can be stored compactly and neatly in an automobile without detriment to the "feel" or handling of the automobile from a driver's point of view and to avoid limitations on the design and size of the steering wheel.

According a preferred embodiment such a manifold is provided as an integral part of a securing member, for example for securing the air bag housing and/or a steering wheel to the steering column shaft (or to the inflator in embodiments having the inflator performing the function of the upper steering column shaft). Such a securing member generally comprises a cap nut and usually a low crown acorn nut.

In this preferred embodiment of the invention this securing member has an open end for receiving an end of the steering column shaft, a closed end opposite the open end, and a surface joining the ends, the surface being provided with at least a pair of oppositely directed apertures or passages extending substantially perpendicularly of the plane of the surface.

Thus a preferred embodiment of the invention provides a steering column assembly comprising a steering column shaft having a substantially axial passage, a source of compressed gas arranged to release gas through an outlet to inflate an air bag through the passage and a securing member for securing an air bag housing and/or a steering wheel onto the steering column shaft, the securing member covering the gas outlet and having at least a pair of opposed apertures communicating with the passage and extending generally radially of the steering column.

An advantage of such an assembly is that it provides that the forces produced by the inflation gas are more evenly distributed over the fabric of the bag, and that reaction forces on the steering column and/or inflator module due to gas release before fitting are reduced.

This is in contrast to known assemblies where the inflation gas leaves the hollow steering column axially of the column, thus applying high mechanical and thermal forces to a relatively small fabric area, which area has also the greatest chance of contacting the driver's face.

In addition, in such known assemblies, before the column is fitted to the vehicle body or the air bag, for example during transport of the column to the assembly factory, the column could become a dangerous projectile if the release of inflation gas is accidentally triggered.

The securing member of the preferred embodiment provides for a net neutral reaction force in the event of gas release, either before or after fitting of the inflator in a vehicle, which is safer. The securing member may be internally screw threaded to co-operate with external screw threading on the steering column or inflator.

An advantageous embodiment of the invention provides means for spacing the gas outlet, for example the open end of the inflator or the end upper steering column shaft, from the apertures of the securing member.

Preferably a filter screen is disposed within the securing member, between the apertures and the gas outlet of the inflator.

Such a filter screen may take the form of a truncated cone dimensioned to fit snugly within the securing member, e.g. the crown nut. The filter screen is preferably formed of sheet metal with filter holes punched in the axially inclined side surfaces. This frusto conical filter screen may constitute the spacing means if it is dimensioned so that it provides a physical barrier to tightening the securing nut member to an extent which would block the apertures.

Preferably the lower peripheral edge of the filter screen is arranged to rest against the internal screw threading of the nut just below the apertures.

The air bag housing may be mounted in the steering wheel and form the hub thereof. Alternatively the air bag housing may be adapted to be secured in or to the steering column shaft and the steering wheel may be adapted to be secured to the column shaft over the air bag housing, the steering wheel having a central aperture through which the air bag is deployed in use, such that the steering wheel can be fitted over the housing as a last stage assembly operation.

In this case the housing is preferably cup shaped and secured to a mounting plate at the end of the steering column with the open end facing outward and being closed by a cover.

Conveniently, this cover snap fits over the open end of the housing. Preferably, the cover is continuous with the front edge of the central aperture in the steering wheel and forms the hub of the steering wheel.

An advantageous embodiment provides that the side walls of the steering wheel which touch the air bag cover lock the cover so that it cannot be manually removed unless the steering wheel is removed.

As a less desirable alternative the cover fits over or into the central aperture in the steering wheel, or forms the central part or hub of the steering wheel.

In use, it is of course essential for the air bag to be deployed through the cover. This may be achieved by providing a plurality of radially extending tear seems in the cover or a tear seam may be provided in the side wall of the cover-where it is mounted to the container flange. Such seams allow the cover to rupture, forming outwardly bent flaps, under the force of the inflating air bag.

Alternatively, the cover may be effectively hinged by being tethered to the air bag housing or to the steering wheel. During deployment the cover is forced out of engagement with the housing (or the steering wheel), and the air bag is thus released for deployment but the cover is prevented from travelling into the interior of the car by the tether. Even when the cover is locked by the steering wheel, the deployment force of the air bag will be sufficient to push the cover off.

The advantage of this embodiment is that it provides for a steering wheel assembly which allows the steering wheel to be removed from the steering column without it being necessary to prior remove the air bag module.

In contrast in conventional assemblies if the steering wheel has to be replaced the air bag module must first be removed and disconnected. Since removal of the air bag assembly should only be carried out by suitably trained personnel the car owner must resort to visiting a repair shop or dealer licensed to handle air bag modules if, for any reason, a new or replacement steering wheel is required.

Another embodiment of the present invention provides for a driver's side air bag arrangement comprising an inflatable bag with an inflation inlet, a housing for the bag, an inflator module for inflating the bag, having an outlet arranged to direct inflation gas into the bag inlet, and a retaining member for holding the air bag to the housing in a region adjacent to and circumscribing the inflation inlet, the retaining member comprising at least one deflection surface and at least one aperture arranged to direct the gas flow from the inflator module outlet in a predetermined direction into the inflatable bag.

The retaining member preferably has a ring-shaped portion which is clamped over that part of the air bag which surrounds the inflation inlet to hold it to the housing. The retaining member also preferably has a cap portion covering the head of the inflator module, i.e. the inflation gas outlet, and providing the deflection surface. Radially extending apertures may be provided to direct the gas flow evenly into the air bag in a thrust neutral manner.

In an alternative embodiment a large number of small holes are arrayed over substantially the whole retaining member and in this embodiment the retaining member forms a filter screen to retain solid particulate material such as products of combustion.

Such retaining member has considerable advantages in that it is relatively cheap to manufacture, easy to install, compact and also effective and safe.

For a better understanding of the present invention and to show how the same may be carried into effect, reference will now be made to the accompanying drawings in which.

Figure 1:
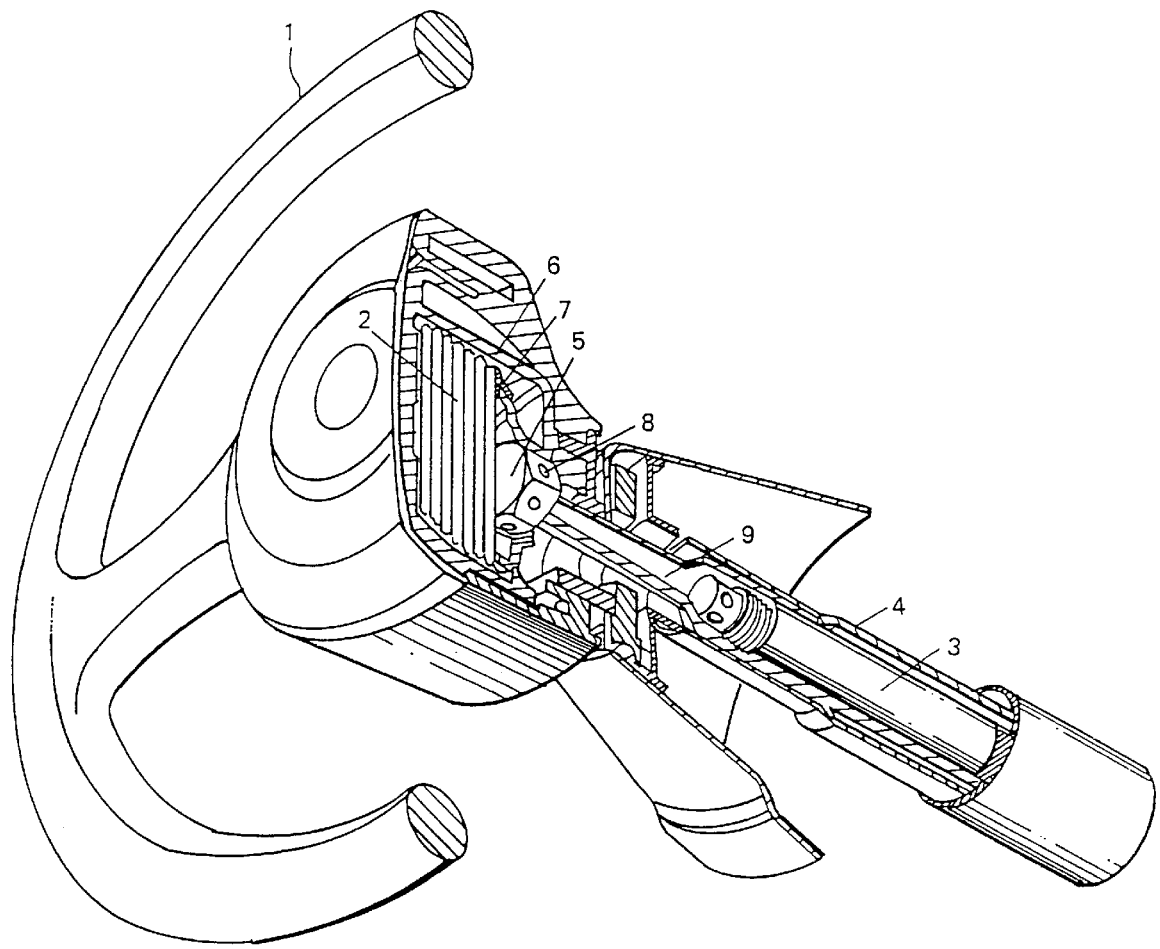
FIG. 1 is a perspective, part cut away view of an arrangement according to the present invention.

In FIG. 1 a steering wheel 1 has an air bag 2 mounted in a central aperture. A source of compressed gas 3 is contained in a hollow steering column 4 and attached thereto by a hexagonal cap nut 5. The air bag 2 is attached to an air bag housing 6 by a retainer ring 7. The nut 5 has apertures 8 formed in each of its six faces and these apertures 8 communicate with a hollow passage 9 in the steering column 4 so that gas from the compressed gas source 3 flows through passage 9 and through the hollow part of nut 5 and out through apertures 8 to inflate the air bag 2.

Figure 2:
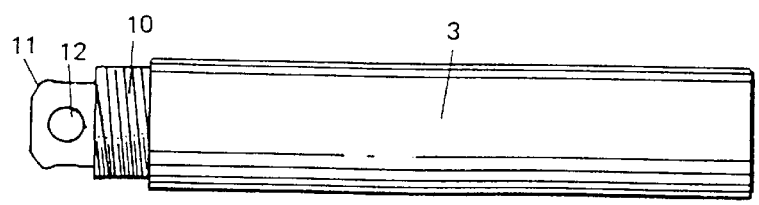
FIG. 2 is a side view of a gas source suitable for use in FIG. 1.

FIG. 2 shows the source of compressed gas 3 which comprises an elongate cylindrical member having a screw-threaded portion 10 at its upper end and an outlet section 11 with apertures 12 arranged at spaced radial positions.

Figure 3:
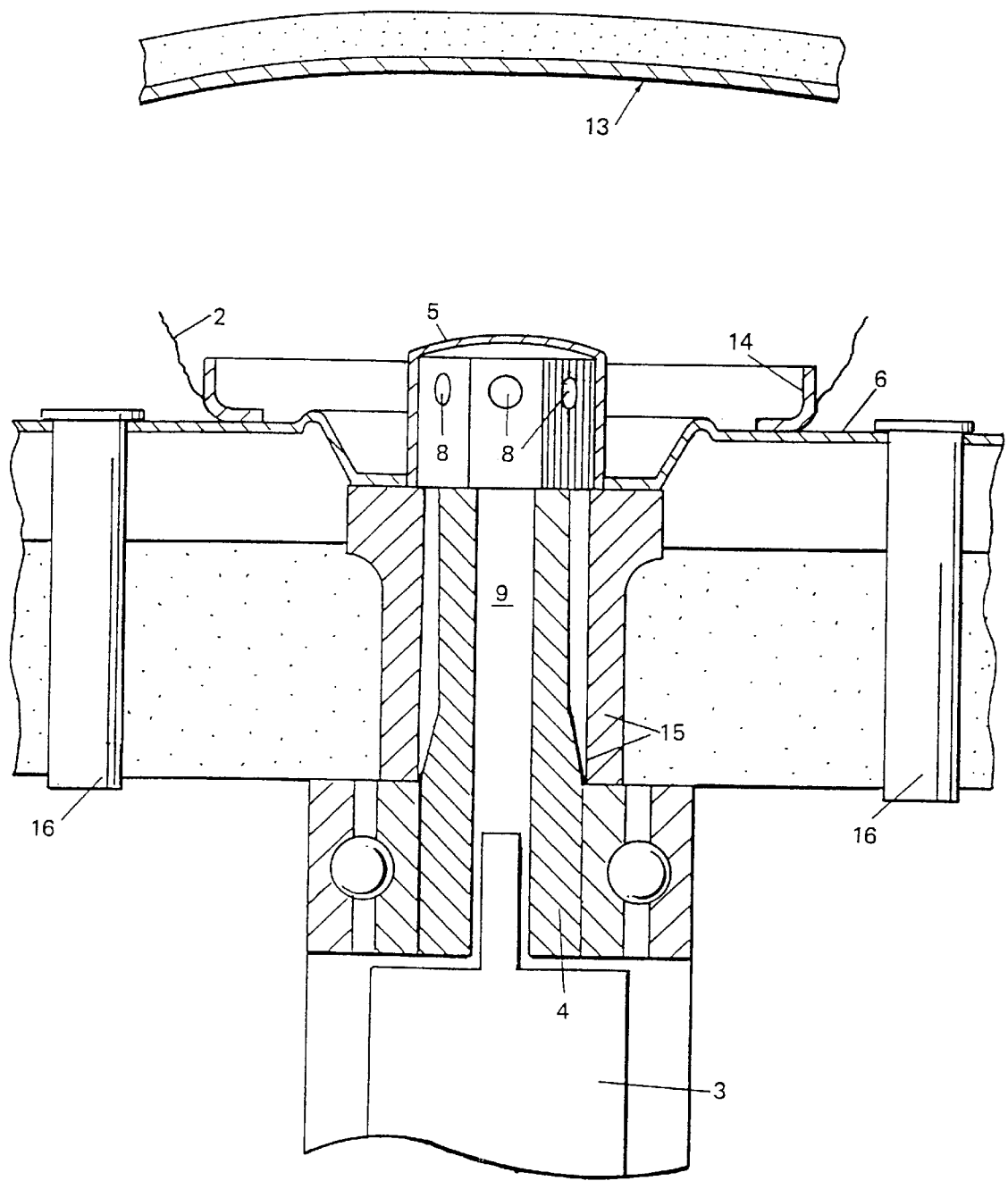
FIG. 3 is a cross-sectional view of a part of FIG. 1.

FIG. 3 shows part of an air bag housing 6 having a cover 13. An inflatable bag 2, partly shown, is folded within the housing and is clamped in place by a retainer ring 14.

The steering wheel 1 has central parts 15 defining a central aperture. The aperture receives a hollow steering column 4 and is attached thereto by means of a securing member 5 in the form of a hexagonal cap nut or low crown acorn nut. The central axial passage 9 of the hollow column 4 is covered by the nut 5. A source of compressed gas 3 directs gas into the passage 9 and may be cylindrical in shape sized to fit within the hollow steering column 4.

The air bag housing assembly, including the housing 6, cover 13, air bag 2 and retainer ring 14, is mounted on the steering wheel 1 by means of bolts 16 in such a position that the cap nut 5 projects into the housing 6. The cap nut 5 is conveniently a low crown hexagonal acorn nut, as is commonly used to attach a steering wheel to a steering column. The cap nut 5 has radially directed apertures 8 formed for example in each of its six faces, to form three opposing pairs of apertures. The apertures 8 communicate with the passage 9 in the steering column 4.

When inflation gas is released, the apertures 8 direct the inflation gas from the passage 9 and radially into the housing 6 to inflate the bag 2. The radial direction of the gas flow spreads the mechanical and thermal forces evenly within the bag 2. The arrangement of the apertures as opposed pairs results in a net neutral reaction force in the event of gas release. Thus axial reaction forces on the steering column and/or inflator module may be substantially eliminated. This is also important for pre-assembly transport of the steering column and inflator module, in case of premature gas release.

Figure 4:
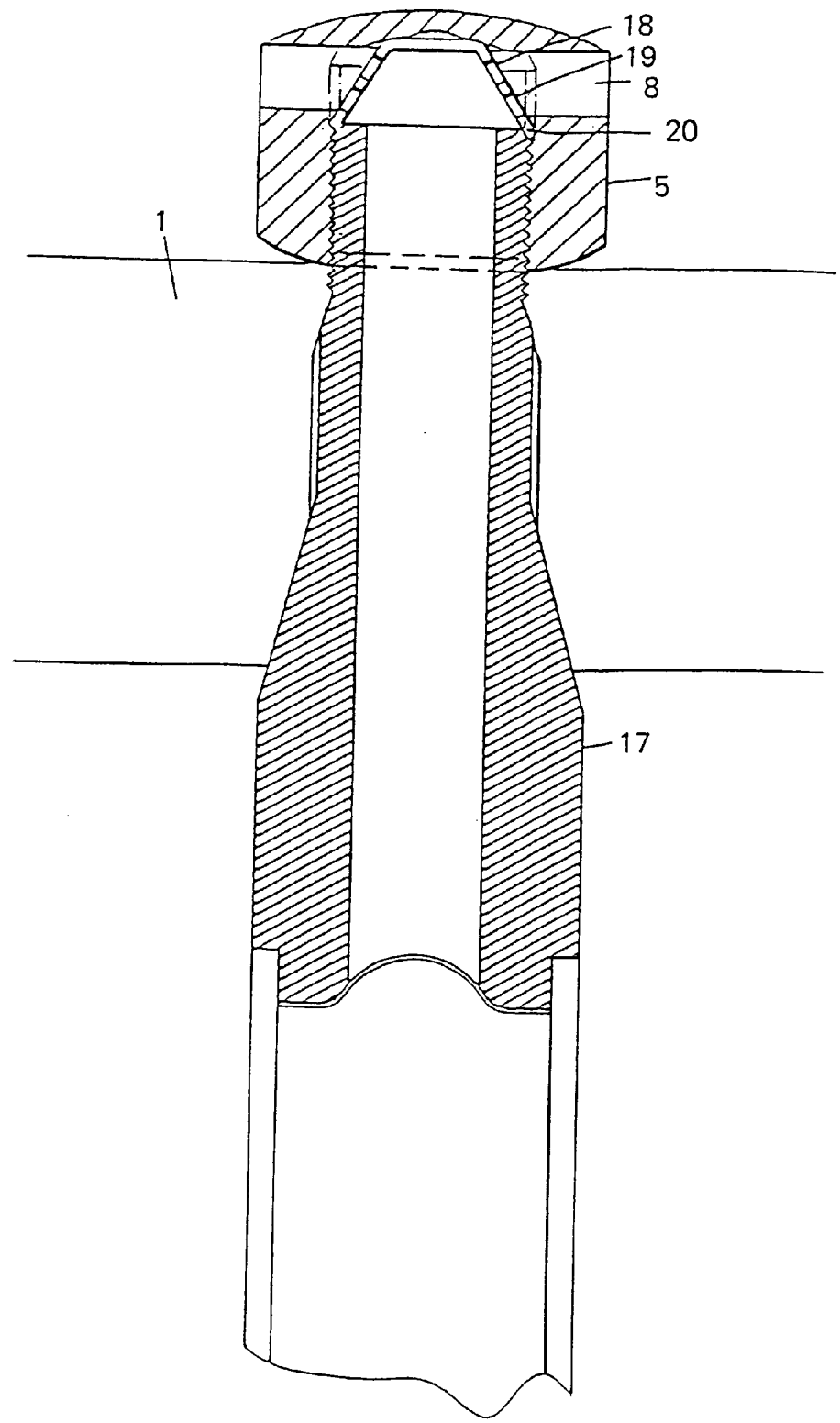
FIG. 4 is a cross-sectional view of an improvement on FIG. 3.

In FIG. 4 the hexagonal cap nut 5 with apertures 8 is screwed onto the steering column head, which in this embodiment is shown as the inflator head 17 since the upper steering column is formed by the gas generator itself. The steering wheel 1 is indicated schematically. A filter screen 18 in the form of a tapering truncated cone of metal with apertures 19 formed in the radial sides is inserted into the screw-threaded hole of the nut so as to screen the apertures 8. The filter screen 18 prevents particulate matter from the inflation process reaching the inside of the air bag. It also prevents splinters from the membrane sealing the gas generator, (commonly known as a burst disc) reaching the inside of the air bag.

In the form illustrated in FIG. 4 the filter screen 18 has the added advantage of defining the position at which the top of the steering column head/inflator head is located within the hexagonal cap nut. Thus the filter screen prevents the nut being tightened to such an extent that the top of the column head/inflator head blocks the apertures 8. Under normal conditions, the filter screen is chosen to be of a size such that the lower peripheral edge 20 rests against the internal screw threading of the nut just below the apertures 8 but does not abut the inflator head. However it will be seen that if a manufacturing error occurs such that the column head extends too far beyond the plane of the steering wheel 1, then the screen will prevent the nut from being tightened too far which would otherwise result in the exit holes from the nut being blocked.

The shape of the filter screen makes it easy and simple to insert into the nut, but ensures that it will not easily be dislodged; in the same way that an arrow head travels easily in one direction and not in the opposite. The lower peripheral edge 20 of the filter screen 18 will jam in the internal screw-threading of the nut if the screen is pulled downwards.

Figure 5:
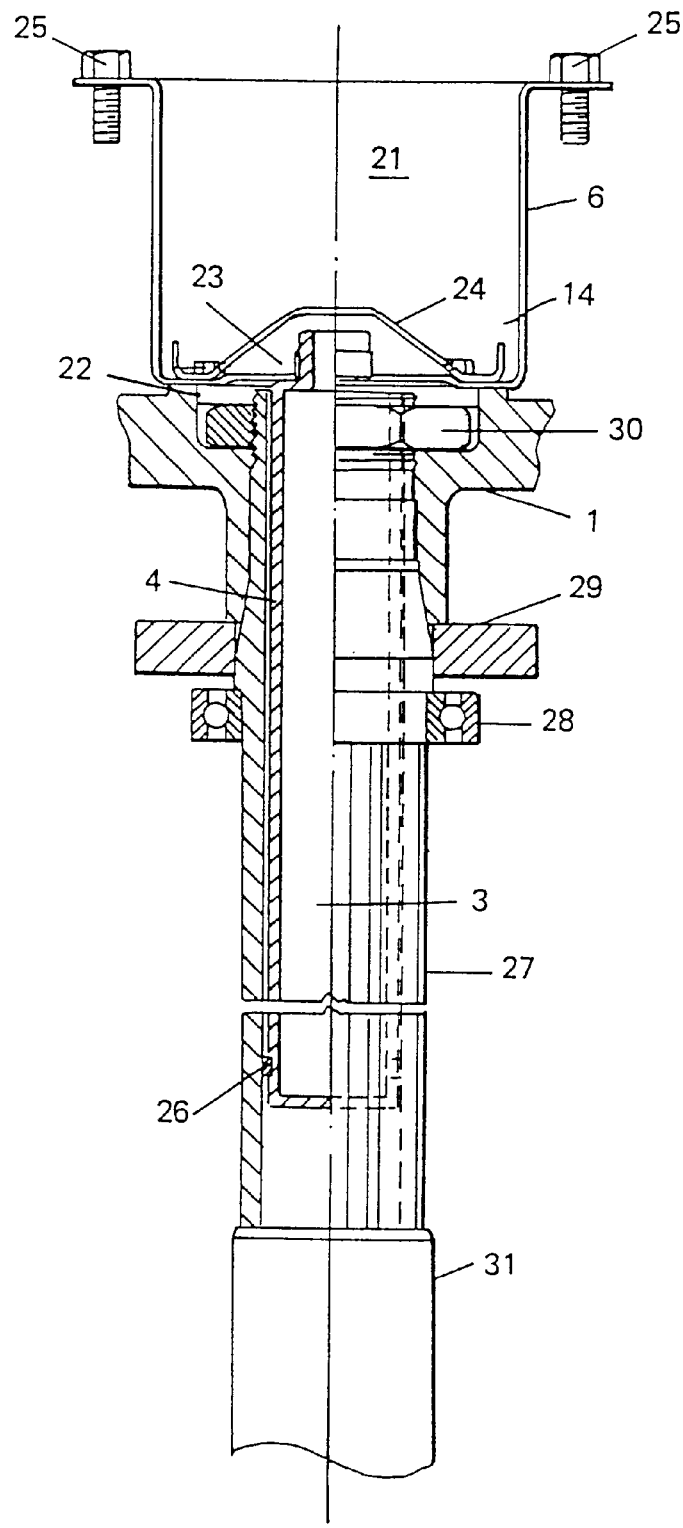
FIG. 5 is a cross-sectional view of a second embodiment of the invention.

In the embodiment of FIG. 5 an air bag module is shown consisting of a cylindrical shaped inflator 3 and an air bag housing assembly. The housing assembly consists of a housing 6 and an air bag, folded in space 21 (air bag not shown) and clamped to the housing by a retaining ring 14, which is mounted to the housing 6 by clinch studs and nuts 2. The retaining ring 14 is preferably a single piece used both to clamp the air bag to the housing 6 and to direct the gas flow from the steering column outlet into the air bag. Depending on the size of the exit holes it can also act as a filter screen for particulate matter issuing from the inflator.

Alternatively a separate filter screen can be inserted below or above the retaining ring 14. The housing 6 has a cover (not shown) to protect the air bag until deployment. During assembly, the inflator 3 is mounted into the housing 6 preferably by being dropped into the steering column shaft from the steering wheel end as this is easiest from a production viewpoint. The housing 6 may alternatively be threaded so that the inflator 3 can be screwed directly into the column. Gas exiting the inflator 3 flows into a chamber 23 formed by the base of the housing 6 and the arched portion of the retaining ring 14 and then through holes 24 in the retainer ring 14 into the air bag in the housing 6. This chamber 23 is provided to cool the gas exiting the inflator to avoid damage to the air bag material but if the gas jet is cool enough the chamber is not necessary and the retaining ring 14 can take a normal, ring-shaped resign with a large opening in the middle for the inflator head.

During assembly, the air bag module is dropped into a widened hollow steering column and mounted to the steering wheel by two or more bolts 25 as shown in FIG. 5. To avoid vibration of the inflator in the steering column, an elastic ring 26 keeps a minimum clearance between the steering column shaft 4 and the inflator 3.

The steering column consists of two parts an upper and a lower column shaft. The upper column shaft 27 has serrations as shown on the outside and slides into the lower steering column shaft 31, which has serrations on the inside. Torque is transmitted from one part to the other via these serrations, but the steering column can nonetheless telescope during crash impact. The steering column is similar to currently used designs in all respects except that the upper column is hollow to accommodate the inflator. In general, the outer diameter of the column, including the steering column bearing 28, a clock spring 29, a central orifice of steering wheel 1 and a steering column nut 30, is increased compared to currently known models. The upper mounting of the steering column is effected through the bearing 28. The clock spring 29 is optional and is a ring-shaped lightweight unit transferring electrical signals from the rotating steering wheel to the fixed car body. The steering wheel 1 transmits torque through serrations to the steering column 27 and is held in place by the steering column nut 30.

During deployment of the unit, the inflator 3 is initiated and gas is released axially from the inflator head and flows through the holes 24 in the retainer ring 14 and into the air bag in the housing space 21. The inflating air bag opens or displaces an air bag cover (not shown) and provides a cushion to protect the head of a driver from the hard steering wheel 1 in a crash situation.

Figure 6:
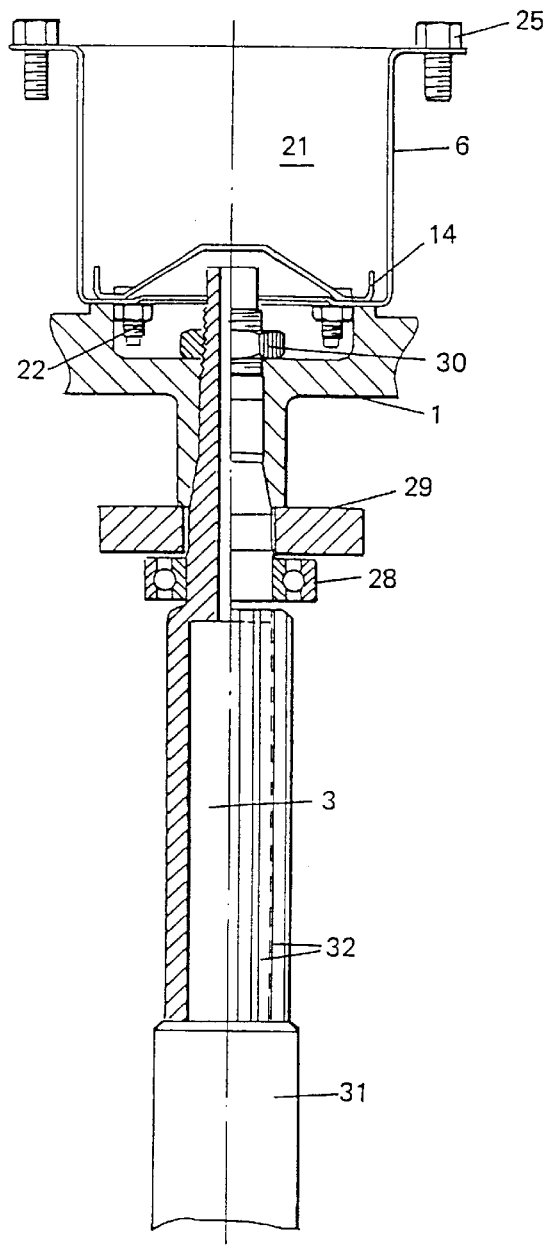
FIG. 6 is a cross-sectional view of a third embodiment of the invention.

In the embodiment of FIG. 6 the inflator 3 takes over the function of the upper steering column and has serrations 32 on its outside which slide into the lower steering column 31, which has serrations on the inside, therefore transmitting torque, but allowing telescoping during crash impact. The outer shape of this inflator in its function as the upper steering column is similar to current design of upper steering column shafts and therefore existing parts can be used like the steering column bearing 28, clock spring 29 the central orifice for the steering wheel 1 and steering column nut 30.

The steering wheel 1 is directly mounted to the head of the inflator 3 and held in place by the steering column nut 30. That is, the inflator head directly forms the column head on which the steering wheel is mounted. In this case the front bearing sits on the head holding the rotating shaft within a fixed cover tube. The torque from the steering wheel is transmitted through the serrations 32 to the inflator.

The air bag housing assembly in FIG. 6 is similar to that of FIG. 5 except that there is no load through the inflator in FIG. 5. In FIG. 6 the assembly consists of the housing 6 and an air bag (not shown) folded in space 21 and clamped to the housing 6 by a retainer ring 14, which is mounted to the housing 6 by cinch studs and nuts 22. The housing has a cover (not shown), to protect the air bag until deployment. During assembly, the inflator head slides into a chamber of the housing assembly formed by the base of the air bag housing 6 and the arch of retainer ring 14. The height of this chamber provides some axial clearance to accommodate manufacturing and assembly tolerances.

Figure 7:
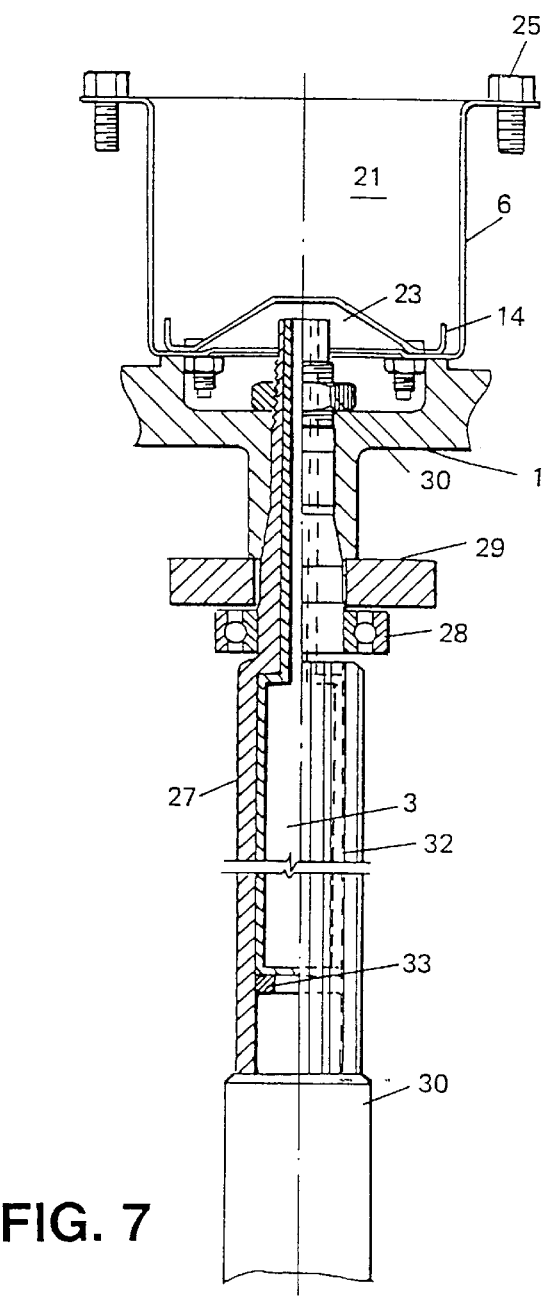
FIG. 7 is a cross-sectional view of a fourth embodiment of the invention.

FIG. 7 illustrates an embodiment of an air bag module in a steering column similar to the embodiment shown in FIGS. 5 and 6 and like parts are denoted by like reference numbers. The inflator 3 has a thin long neck protruding through the hollow upper steering column into the chamber 23 formed by the air bag housing 6 and the retainer ring 14.

In this embodiment the inflator 3 is inserted into the hollow upper steering column from the bottom, and is held by a ring shaped nut 33 with threads on its outer side. Alternatively the inflator head may be threaded on the outside to screw into the column. The steering wheel 1 is then mounted to the steering column and held in place by the steering column nut 30 which is screwed to the inflator neck protruding out of the steering column. This, in turn, holds the inflator in the steering column. The air bag housing assembly and its function is as shown and described above.

Figure 8:
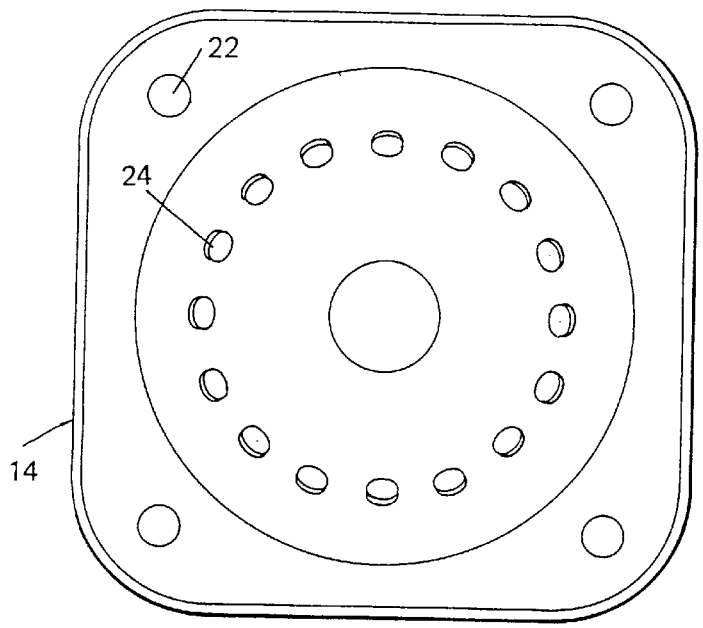
FIG. 8 is a top view of a retaining member for use in the arrangement of the invention.

FIG. 8 illustrates the retaining ring 14 to a larger scale showing gas exit holes 24 arranged radially around a surface of the retaining ring 14 which is inclined to the axis of the steering column. A diverting surface 34 prevents flow of the gas from the inflator in a direct axial direction. FIG. 8 illustrates four retaining bolts 22, one at each corner, which fasten the retaining ring 14 to the housing 6.

Figure 9:
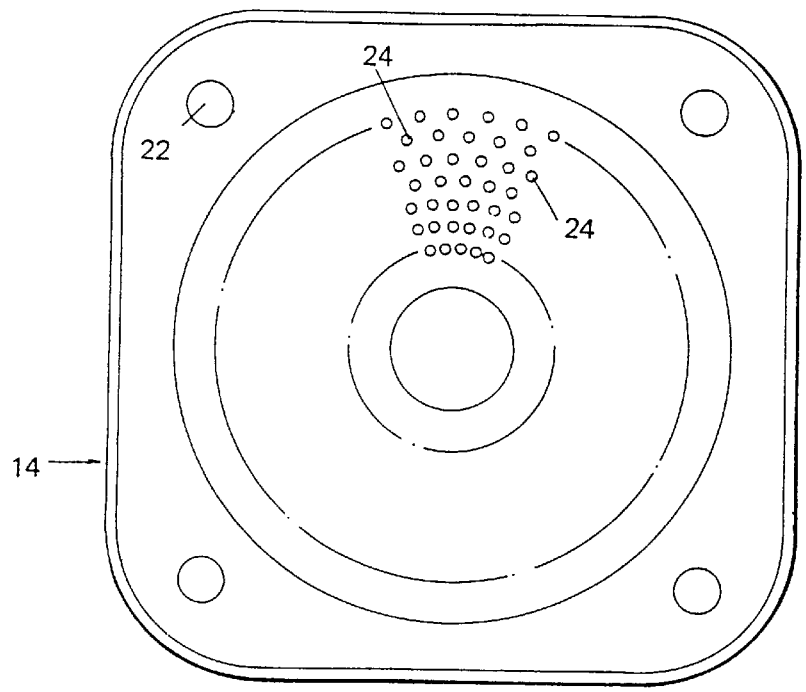
FIG. 9 is a top-plan view of a alternative embodiment of a retaining member.
Figure 10:
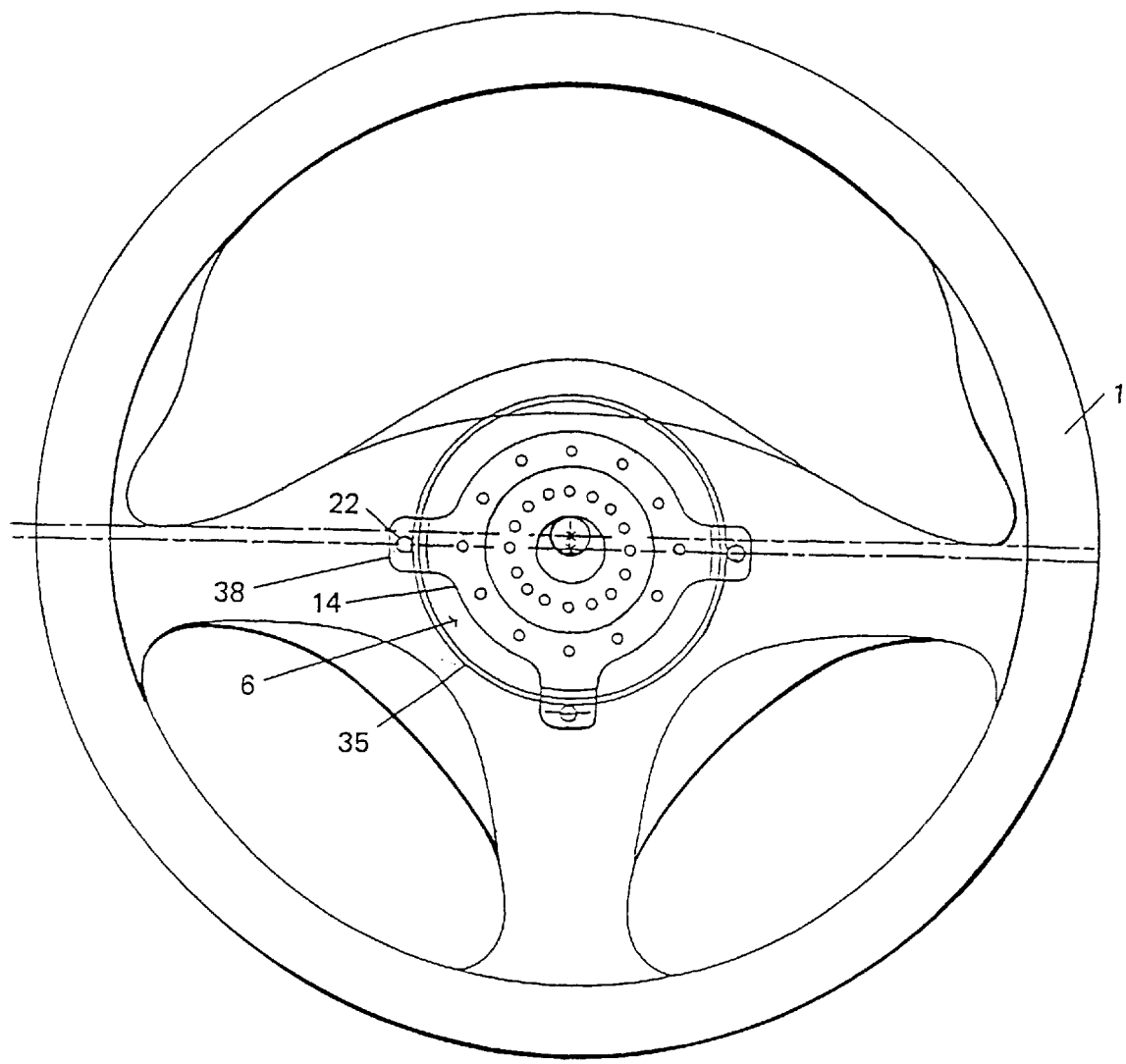
FIG. 10 is a schematic view of the front of a steering wheel assembly in accordance with the present invention.
Figures 11, 12:
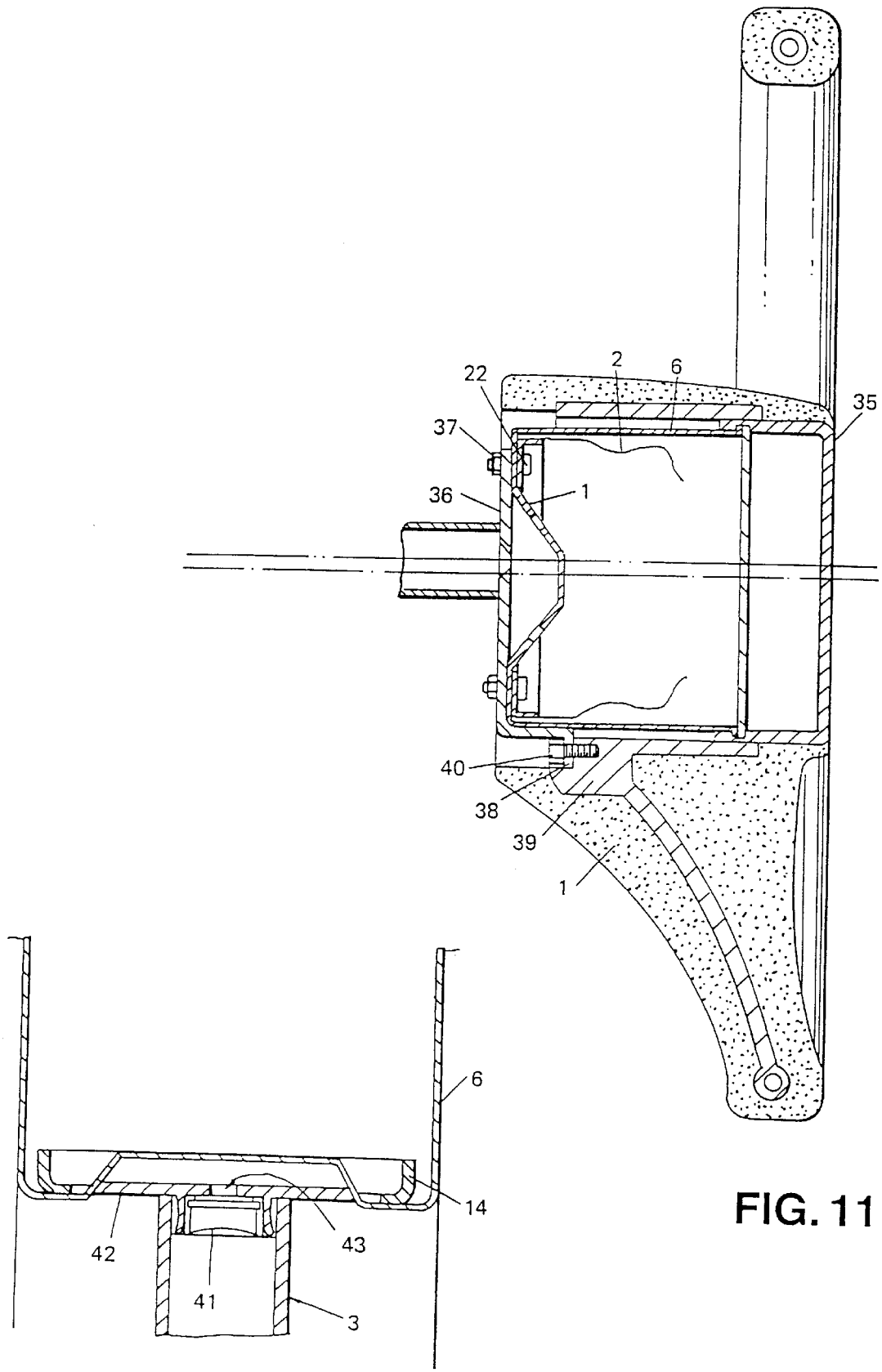
FIG. 11 is a section through the steering wheel assembly shown in FIG. 10 along lines I—I.
FIG. 12 is a cross-sectional view of a part of an embodiment of the invention illustrating the top of an inflator.

In FIG. 9 a large number of small holes 24 are shown and in this embodiment the retaining ring 14 acts as an integral filter screen of course, a separate filter screen could alternatively be used. In FIGS. 10 and 11 the steering wheel assembly is illustrated from above and it comprises an air bag 2 folded into an air bag module mounted in a cup shaped housing 6. A retainer ring 14 has bolts 22 which engage in holes in the base of the housing 6. A cover 35 is shaped onto and over the open end of the housing 6. The housing 6 is then mounted to a mounting plate 36 on the end of the steering column (not shown) by nuts 37 torqued on the retainer ring bolts 22.

The mounting plate 36 on the steering column has three flanges 38 extending radially outward of the plate 36 and around the housing 6. A steering wheel 1 with a central aperture, the internal diameter of which accommodates the external diameter of the housing 6, fits onto the housing 6. The steering wheel has three mounting flanges 39 which correspond in position with the flanges 38 of the mounting plate 36. Each of the mounting plate flanges 38 and the steering wheel flanges 39 have bolt holes in them and the steering wheel 1 is secured to the steering column by passing bolts 40 through these.

The axial length of the central aperture in the steering wheel 1 is such that when it is secured in position the cover 35 is continuous with its front edge, thereby giving the appearance of being an integral part of the steering wheel.

The steering column and air bag housing 6 effectively comprise a single unit, which is assembled in a manufacturing plant. Under normal circumstances there is no reason to disassemble this unit. The air bag housing 6 is a relatively small cylindrical unit sitting on top of the column. Therefore, during the car assembly process other interior car component can be mounted after the column has been fixed in place. The steering wheel 1 is then mounted at the end of the assembly process using bolts 40 only. Consequently, it can easily be replaced or exchanged by the car owner at a later date.

In order to facilitate deployment of the air bag 2 the cover 35 is provided with a star shaped or peripheral tear seam (not visible). When the cover 35 ruptures under impact of the inflating air bag, the segment shaped flaps are bent-backwards, and let the bag pass.

As an alternative, a tether is moulded into or connected co the cover. This tether is secured to the outer side of the air bag housing 6. During deployment of the air bag, the cover 35 tears where it is mounted to the air bag housing 6 or the complete cover moves forward. This motion changes to an upward rotation once the tether is tensioned.

The steering wheel preferably locks the cover on so that it cannot be removed manually without removing the steering wheel first.

FIG. 12 shows an enlarged cross-sectional view of a variant of an inflator head in which the inflator head and the inflator are built as one unit. It is possible to assemble the inflator and the air bag housing, including the air bag and the retainer ring, first, and then to assemble this unit as one piece into the wheel mounted to the steering column.

The upper part of inflator 3 is sealed with a burst disc 41 and a filter screen 42. The inflator head 3 has an axial gas outlet or orifice 43, and the air bag housing 6 is shaped so as to provide a small clearance space between the axially directed outlet and the lower wall of the housing so as to divert the gas flow in a radial direction relative to the inflator.

This provides protection for the air bag material from the hot gas issuing from the inflator by forcing it to travel further and thus cool before entering the air bag. It also provides for a more even inflation rate and encourages radial expansion of the air bag.

A retainer ring 14 is shown to hold the air bag housing in place in the steering wheel.

Figure 13:
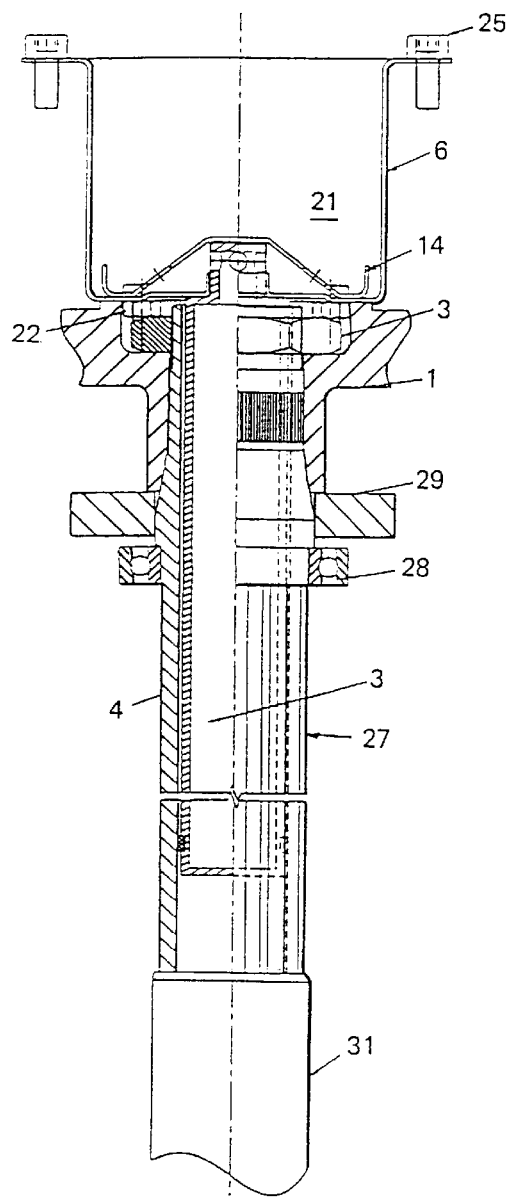
FIG. 13 is a part cut away cross-sectional view of a steering column arrangement according to the invention illustrating an inflator in a steering column shaft.

In the embodiment of FIG. 13 the inflator is a drop-in module 3 and fits into a hollow steering column shaft t which may conveniently be widened compared to a conventional steering column. The upper mounting of the steering column is effected through a bearing 28 as shown in FIG. 13. A clock spring 29 is shown which is a ring shaped lightweight plastic unit with a connector an each side, which transfers electrical signals such as for horn function or air bag initiation (of an air bag sitting in the wheel) from the rotating steering wheel to the fixed steering column. The clock spring is optional and is not needed if electrical connections to the steering wheel are unnecessary or are achieved in any different manner. The steering wheel 1 is attached to the steering column by the central nut 30.

During assembly, the inflator is inserted from the top of the column shaft and screwed into the column shaft by threads on the lower end of the inflator. Then the housing 6 is mounted into the steering wheel by bolts 22. These bolts can be used to hold the retainer ring, or different bolts may be used for this function. The retainer ring clamps an air bag (not shown) to the housing 6. The air bag is folded in space 21. The housing 6 has a cover (not shown) to protect the air bag until deployment.

During deployment of the unit, the inflator is initiated and the gas is released through radially arranged nozzles 44 of the head of the inflator 3 into the air bag in the housing space 21 opening the cover and providing the required cushion to protect the face of the driver from the hard steering wheel in a crash situation.

Figure 14:
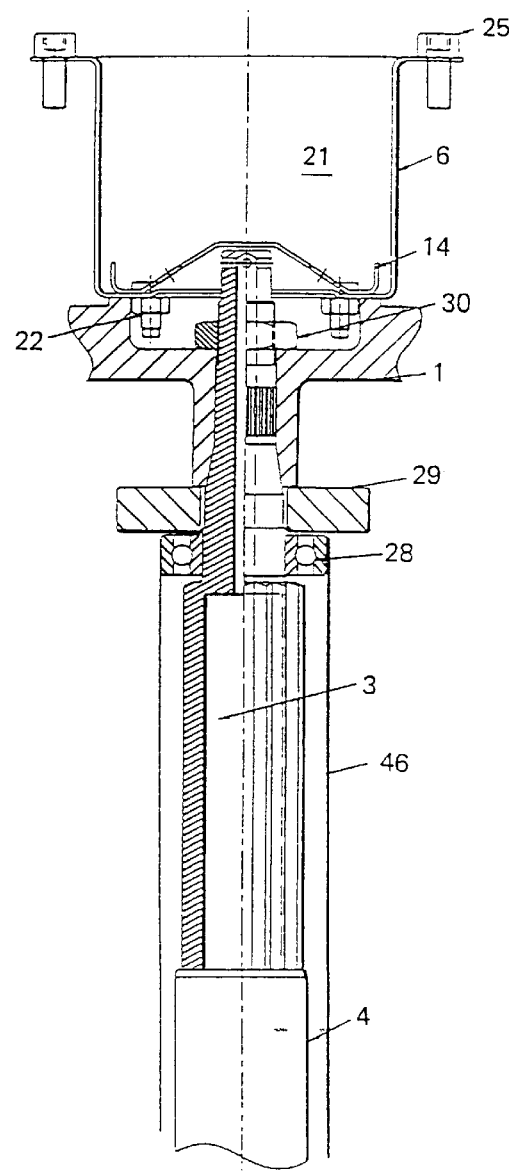
FIG. 14 is a part cut away and part cross-sectional view of a steering column arrangement according to the invention illustrating use of the inflator as an upper part of a steering column shaft.

In the embodiment of FIG. 14 the inflator 3 takes over the function of the upper steering wheel column shaft and is connected directly to the lower part of the steering column shaft by a mating part 45 which is a hollow shaft with serrations to transmit the torque. The upper parts of the inflator extend again through the steering column bearing 28 and the clock spring 29 into the centre of the steering wheel 1 and is secured by central steering column nut 30, with the head of the inflator 3 projecting through the air bag housing 6 into the space 21. The air bag (not shown) is folded round the head of the inflator 3 in space 21. The air bag housing 6 is fixed to the steering wheel 1 by bolts 22. The retainer ring can be attached by bolts to the housing 6, and the same bolts can be used to assemble this unit into the steering wheel 1, or, alternatively, different bolts are used to attach the unit comprised of the housing, retainer ring and bag so as to clamp the bag between housing and retainer ring to the steering wheel.

A non-load bearing cover 46 is provided for the steering column to protect the inflator 3.

Figure 15:
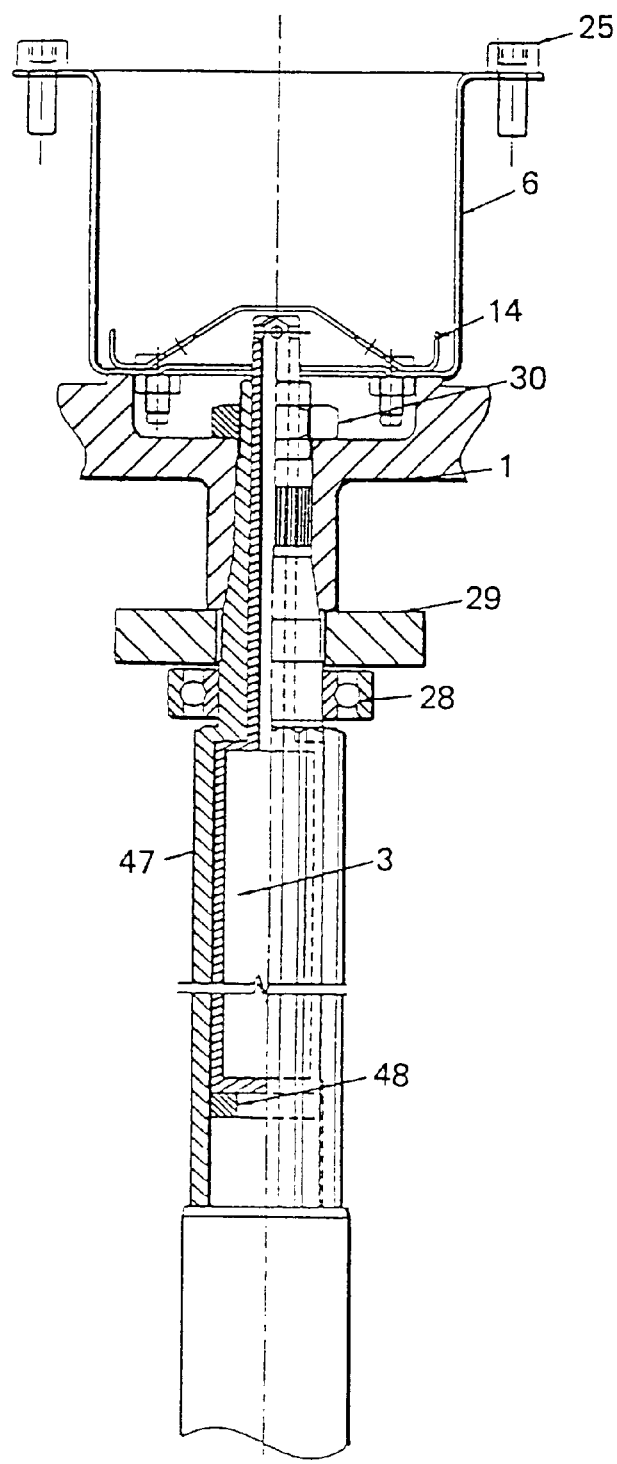
FIG. 15 is a part cut away and part cross-sectional view of a steering column arrangement according to another embodiment of the invention wherein the inflator partly adopts functions of a steering column shaft.

FIG. 15 illustrates an embodiment in which the inflator 3 is partially separate from the steering column functions so that the steering column bearing 28, the clock spring 29 and the steering wheel 1 are close in size to those presently used. The steering wheel is held axially to the head of the inflator 3 by central nut 30. The inflator 3 sits inside a sleeve 47 comprised of the hollow steering column shaft which transmits loads including torque, bending and tensile forces. The inflator is mounted in the shaft by a nut 48. The steering column bearing 28 and clock spring 29 fit over this sleeve 47 and the steering wheel 1 is bolted on top. Wires would generally be provided at the lower end of the inflator for transmission of a signal from a crash sensor to effect ignition of the inflator module.

The gas tank of the inflator may of course sit deeper in the steering column than is illustrated in FIG. 15 such that only a long neck with a smaller outer diameter than the inflator itself then extends through the hollow steering column and into the air bag. This has the advantage that the diameter of the hollow steering column shaft can be reduced compared to FIG. 14 and the inner diameter of the steering wheel and diameter of clock spring, bearing and central nut can be reduced, making these parts closer in size to the size which is presently used with solid steering columns. In this case, the inflator must be mounted through the bottom of the shaft. Therefore, the inflator and housing 6 do not form a single unit, but rather the housing is mounted by the bolts 22 whereas the inflator, mounted through the bottom of the hollow shaft, is held in place by the nut 48. In this alternative embodiment the inflator neck does not transmit any forces, because the central nut mounts the column shaft to the steering wheel 1 directly, whereas in FIG. 15, there are tensile forces in the inflator neck, because the central nut mounts the inflator to the wheel 1, and the inflator transmits these loads to the hollow shaft through the surface where its diameter increases.

I claim:

1. A driver's air bag arrangement comprising: an inflatable bag (2), a housing (6) for the bag, an inflator module for inflating the bag (2), the inflator module comprising an inflator initiator responsive to a crash condition sensor, and a source of compressed gas (3) responsive to the inflation initiator to release the gas to inflate the bag through an inflation inlet, wherein the source of compressed gas comprises a generally cylindrically shaped gas container (3) having an outlet for the gas located substantially at one end, the outlet being seated under non-crash conditions and being unsealed in response to the inflation initiator, and wherein the cylindrically shaped gas container (3) is shaped and dimensioned so that a substantial part of the container is locatable within and coaxial with a steering column shaft of the automobile, the arrangement being characterised by a manifold (5,14) for directing the gas issuing from the gas source (3) into the bag (2) in the housing (6) to inflate the bag (2) in an evenly distributed manner the manifold having holes arranged radially of the steering column shaft to distribute the gas flow into the bag, wherein the manifold is provided as an integral part of a securing member adapted to secure the upper steering column shaft (4) to the air bag housing (6).

2. An arrangement according to claim 1, wherein the securing member is adapted to secure the upper steering column shaft or the inflator to a steering wheel.

3. An arrangement according to claim 1, wherein the securing member comprises a cap nut with internal screw threading.

4. An arrangement according to claim 3, wherein the securing member comprises a low crown acorn nut with internal screw threading.

5. An arrangement according to claim 1, wherein the securing member has an open end for receiving an end of the steering column shaft, a closed end opposite the open end, and a surface joining the ends, the surface being provided with at least a pair of oppositely directed apertures or passages extending substantially perpendicularly of the plane of the surface.

6. An arrangement according to claim 5 comprising means for spacing the gas outlet from the apertures of the securing member.

7. An arrangement according to claim 5 comprising a filter screen disposed between the apertures and the inflator gas outlet.

8. An arrangement according to claim 7 as appended to claim 6, wherein the filter screen comprises the spacing means and is dimensioned to provide a physical barrier to tightening the securing member to an extent which blocks the apertures.

9. An arrangement according to claim 7, wherein the filter screen comprises a truncated cone dimensioned to fit snugly within the securing member.

10. An arrangement according to claim 7, wherein the filter screen is formed of sheet metal with filter holes formed in the axially inclined side surfaces.

11. An arrangement according to claim 8, wherein the lower peripheral edge of the filter screen is arranged to rest laterally against the internal screw threading of the securing member just below the apertures.

12. An arrangement according to claim 1, wherein the air bag housing is adapted to be secured to the steering column shaft and the steering wheel is adapted to be secured to the column shaft over the air bag housing, the steering wheel having a central aperture through which the air bag is deployed in use, and wherein the steering wheel is adapted to be fitted as a last stage of the assembly process.

13. An arrangement according to claim 12 comprising an air bag housing cover having a snap-fit fastening for fixing to the open end of the housing.

14. An arrangement according to claim 13, wherein the side walls of the steering wheel central aperture are arranged to lock the cover in place to secure it against accidental displacement.

15. An arrangement according to claim 13, wherein the cover is provided with tear seams adapted to rupture to release the air bag for deployment in response to a crash condition being detected.

16. An arrangement according to claim 1, wherein the inflator is an integral part of the steering column shaft.

17. An arrangement according to claim 2, wherein the securing member comprises a cap nut with internal screw threading.

18. A driver's air bag arrangement comprising: an irnflatable bag (2), a housing (6) for the bag (2), an inflator module for inflating the bag (2), the inflator module comprising an inflator initiator responsive to a crash condition sensor, and a source of compressed gas (3) responsive to the inflation initiator to release the gas to inflate the bag through an inflation inlet, wherein the source of compressed gas comprises a generally cylindrically shaped gas container (3) having an outlet for the gas located substantially at one end, the outlet being sealed under non-crash conditions and being unsealed in response to the inflation initiator, and wherein the cylindrically shaped gas container (3) is shaped and dimensioned so that a substantial part of the container is locatable within and coaxial with a steering column shaft of the automobile, the arrangement further comprising a manifold for directing the gas issuing from the gas source into the bag in the housing to inflate the bag in an evenly distributed manner the manifold having holes arranged radially of the steering column shaft to distribute the gas flow into the bag, wherein the manifold is provided as an integral part of a securing member which is adapted to secure the air bag (2) to the air bag housing.

* * * * *